(12) United States Patent
Wang

(10) Patent No.: US 9,591,642 B2
(45) Date of Patent: *Mar. 7, 2017

(54) ALLOCATING A CONTROL CHANNEL FOR CARRIER AGGREGATION

(71) Applicant: INTEL CORPORATION, Santa Clara, CA (US)

(72) Inventor: Ping Wang, Bejing (CN)

(73) Assignee: INTEL CORPORATION, Santa Clara, CA (US)

( * ) Notice: Subject to any disclaimer, the term of this patent is extended or adjusted under 35 U.S.C. 154(b) by 164 days.

This patent is subject to a terminal disclaimer.

(21) Appl. No.: 14/482,107

(22) Filed: Sep. 10, 2014

(65) Prior Publication Data

US 2015/0029984 A1    Jan. 29, 2015

Related U.S. Application Data

(63) Continuation of application No. 13/275,608, filed on Oct. 18, 2011, now Pat. No. 8,843,168, which is a
(Continued)

(51) Int. Cl.
*H04W 72/04* (2009.01)
*H04L 5/00* (2006.01)
(Continued)

(52) U.S. Cl.
CPC ....... *H04W 72/0446* (2013.01); *H04L 1/1614* (2013.01); *H04L 5/001* (2013.01);
(Continued)

(58) Field of Classification Search
CPC ............. H04L 5/0053; H04L 27/2647; H04W 72/042; H04W 48/12; H04J 11/0069
See application file for complete search history.

(56) References Cited

U.S. PATENT DOCUMENTS 8,429,515 B2 *  4/2013  Han ............... H04L 1/0027
                                                    370/327
8,626,218 B2 *  1/2014  Wang ............. H04L 5/003
                                                    370/241
(Continued)

FOREIGN PATENT DOCUMENTS

WO     2010/088536 A1    8/2010

OTHER PUBLICATIONS

Notice of Allowance received for U.S. Appl. No. 12/967,652, mailed on Sep. 3, 2013, 11 pages.
(Continued)

*Primary Examiner* — Bobbak Safaipour
(74) *Attorney, Agent, or Firm* — Thorpe North & Western

(57) ABSTRACT

Methods for allocating a physical downlink control channel (PDCCH) to reduce a number of PDCCH candidates in a search space for carrier aggregation on a user equipment (UE) are disclosed. The method comprises the step of selecting a control channel element (CCE) aggregation level for a PDCCH allocation for each of a plurality of user equipments (UEs) at an evolved NodeB (eNB). The operation of identifying a transmission mode for each of a plurality of component carriers (CCs) associated with the PDCCH at the eNB follows. The next operation of the method is assigning each CC's downlink control information (DCI) into CCEs in a PDCCH search space in the PDCCH starting at a CCE location based on the CC's transmission mode and the CCE aggregation level for the UE receiving the CC.

18 Claims, 14 Drawing Sheets

Related U.S. Application Data continuation of application No. 12/967,652, filed on Dec. 14, 2010, now Pat. No. 8,626,218.

(60) Provisional application No. 61/330,837, filed on May 3, 2010.

(51) Int. Cl.

| | | |
|---|---|---|
| *H04L 12/801* | (2013.01) | |
| *H04L 12/841* | (2013.01) | |
| *H04L 12/835* | (2013.01) | |
| *H04W 28/12* | (2009.01) | |
| *H04L 1/16* | (2006.01) | |
| *H04W 4/06* | (2009.01) | |
| *H04W 76/04* | (2009.01) | |
| *H04W 36/22* | (2009.01) | |

(52) U.S. Cl.
CPC ............ *H04L 5/003* (2013.01); *H04L 5/0032* (2013.01); *H04L 5/0053* (2013.01); *H04L 5/0064* (2013.01); *H04L 5/0094* (2013.01); *H04L 47/11* (2013.01); *H04L 47/14* (2013.01); *H04L 47/283* (2013.01); *H04L 47/30* (2013.01); *H04W 4/06* (2013.01); *H04W 28/12* (2013.01); *H04W 72/042* (2013.01); *H04W 72/0406* (2013.01); *H04W 72/0413* (2013.01); *H04W 76/046* (2013.01); *H04W 36/22* (2013.01); *H04W 72/0486* (2013.01); *Y02B 60/43* (2013.01)

(56) References Cited

U.S. PATENT DOCUMENTS

| | | | | |
|---|---|---|---|---|
| 8,843,168 | B2* | 9/2014 | Wang | H04L 5/003 370/241 |
| 8,983,516 | B2* | 3/2015 | Wang | H04L 5/003 370/241 |
| 2010/0113043 | A1 | 5/2010 | Hsuan et al. | |
| 2010/0157922 | A1 | 6/2010 | Kim et al. | |
| 2010/0159938 | A1 | 6/2010 | Shin et al. | |
| 2011/0070845 | A1* | 3/2011 | Chen | H04L 5/001 455/91 |
| 2011/0110316 | A1* | 5/2011 | Chen | H04L 5/0053 370/329 |
| 2011/0205978 | A1* | 8/2011 | Nory | H04L 5/0007 370/329 |
| 2011/0269492 | A1* | 11/2011 | Wang | H04L 5/003 455/509 |
| 2013/0016655 | A1* | 1/2013 | Heo | H04L 5/001 370/328 |
| 2013/0021948 | A1* | 1/2013 | Moulsley | H04W 24/02 370/254 |
| 2013/0022005 | A1* | 1/2013 | Yano | H04L 1/0046 370/329 |
| 2013/0028108 | A1* | 1/2013 | Wu | H04L 5/001 370/252 |
| 2013/0044605 | A1* | 2/2013 | Lee | H04L 5/0007 370/241 |
| 2013/0058306 | A1* | 3/2013 | Noh | H04L 1/1671 370/329 |
| 2013/0088973 | A1* | 4/2013 | Yang | H04L 5/003 370/241 |
| 2013/0107809 | A1* | 5/2013 | Ko | H04L 5/0053 370/328 |
| 2013/0128826 | A1* | 5/2013 | Lin | H04L 1/1861 370/329 |
| 2013/0136006 | A1* | 5/2013 | Kim | H04L 5/001 370/241 |
| 2013/0336263 | A1* | 12/2013 | Wang | H04L 5/003 370/329 |

OTHER PUBLICATIONS

Office Action Received for U.S. Appl. No. 12/967,652, mailed on Jun. 11, 2013, 9 pages.
Notice of Allowance received for U.S. Appl. No. 13/275,608, mailed on May 21, 2014, 10 pages.
Office Action received for U.S. Appl. No. 13/275,608, mailed on Jan. 17, 2014, 8 pages.
Notice of Allowance received for U.S. Appl. No. 13/969,966, mailed on Nov. 7, 2014, 10 pages.
Office Action received for U.S. Appl. No. 13/969,966, mailed on Jul. 18, 2014, 8 pages.
3GPP, "Technical Specification Group Radio Access Network; Evolved Universal Terrestrial Radio Access (E-UTRA); Physical layer procedures", Release 8, 3GPP TS 36.213, vol. 8.8.0, Sep. 2009, pp. 1-77.

* cited by examiner

ALLOCATING A CONTROL CHANNEL FOR CARRIER AGGREGATION

RELATED APPLICATIONS

The present application is continuation of U.S. patent application Ser. No. 13/275,608 filed on Oct. 18, 2011 (now U.S. Pat. No. 8,843,168 issued on Sep. 23, 2014), which is a continuation of Ser. No. 12/967,652 filed on Dec. 14, 2010 (now U.S. Pat. No. 8,626,218 issued on Jan. 7, 2014), which claims the benefit of U.S. Provisional Patent Application Ser. No. 61/330,837, filed on May 3, 2010, all of which are hereby incorporated by reference for all purposes.

BACKGROUND

Wireless mobile communication technology uses various standards and protocols to transmit data between a base transceiver station (BTS) and a wireless mobile device. In the third generation partnership project (3GPP) long term evolution (LTE) systems, the BTS is a combination of evolved Node Bs (eNode Bs or eNBs) and Radio Network Controllers (RNCs) in a Universal Terrestrial Radio Access Network (UTRAN), which communicates with the wireless mobile device, known as a user equipment (UE). Data is transmitted from the eNode B to the UE via a physical downlink shared channel (PDSCH). A physical downlink control channel (PDCCH) is used to transfer downlink control information (DCI) that informs the UE about resource allocations or scheduling related to downlink resource assignments on the PDSCH, uplink resource grants, and uplink power control commands. The PDCCH can be transmitted prior to the PDSCH in each subframe transmitted from the eNode B to the UE.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 5A illustrates a block diagram of a resource element groups (REGs) in a Resource Block (RB) in accordance with an example;

FIG. 5B illustrates a block diagram of a resource element groups (REGs) in a Resource Block (RB) in accordance with an example;

Figure 1:
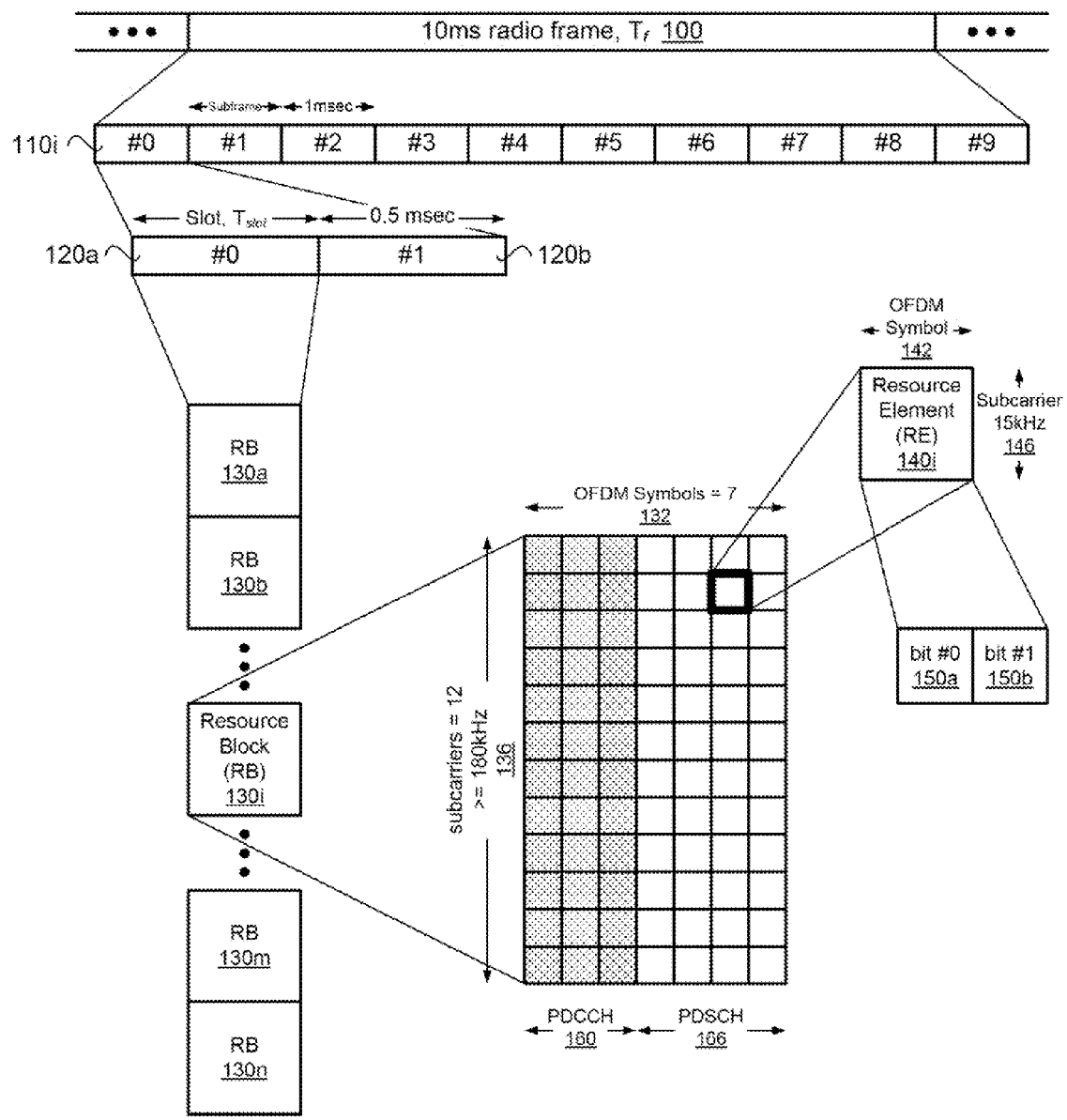
FIG. 1 illustrates a block diagram of radio frame resources in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element.

EXAMPLE EMBODIMENTS

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter. The following definitions are provided for clarity of the overview and embodiments described below.

A system and method is provided for allocating a physical downlink control channel (PDCCH) to reduce a number of PDCCH candidates in a search space for carrier aggregation on a user equipment (UE). A control channel element (CCE) aggregation level is selected for a PDCCH allocation for each of a plurality of user equipments (UEs) at an evolved NodeB (eNB). A transmission mode is identified for each of a plurality of component carriers (CCs) associated with the PDCCH at the eNB. Each CC's downlink control information (DCI) is assigned into CCEs in a PDCCH search space starting at a CCE location based on the CC's transmission mode and the CCE aggregation level for the UE receiving the CC. The eNode B can provide the allocation of the PDCCH and assignment of the CCEs to a search space using a transmission mode to create more search spaces for the CCs of the UE. Using the transmission mode can generate up to eight additional search space starting locations by partitioning the search space. The UE may use the carrier index (CI) or the DCI size along with the transmission mode to assign the CCEs to a PDCCH search space.

After the CCEs are assigned to a PDCCH search space, the PDCCH can be transmitted to a UE. At the UE, the PDCCH can be searched by the UE for each of the UE's CC's DCI. The UE may use the transmission mode, the carrier index (CI), and/or the DCI size to efficiently search smaller PDCCH search spaces in the PDCCH.

Data in wireless mobile communication can be transmitted on the physical (PHY) layer by the eNode B (also commonly denoted as an enhanced Node B, evolved Node B, or eNB) to the user equipment (UE) using a generic long term evolution (LTE) frame structure, as illustrated in FIG. 1. A radio frame 100 of a signal used to transmit the data is configured to have a duration, $T_f$, of 10 milliseconds (ms). Each radio frame can be segmented or divided into ten subframes 110i that are each 1 ms long. Each subframe can be further subdivided into two slots 120a and 120b, each with a duration, $T_{slot}$, of 0.5 ms. The first slot (#0) 120a can include a physical downlink control channel (PDCCH) 160 and a physical downlink shared channel (PDSCH) 166, and the second slot (#1) 120b can include data using the PDSCH. Each slot for a component carrier (CC) used by the eNode B and the UE can include multiple resource blocks (RBs) 130a, 130b, 130i, 130m, and 130n based on the CC frequency bandwidth. Each RB 130i can include twelve 15 kHz subcarriers 136 (on the frequency axis) and 6 or 7 orthogonal frequency-division multiplexing (OFDM) symbols 132 (on the time axis) per subcarrier. The RB uses seven OFDM symbols if a short or normal cyclic prefix is employed. The RB uses six OFDM symbols if an extended cyclic prefix is used. The resource block can be mapped to 84 resource elements (REs) 140i using short or normal cyclic prefixing, or the resource block can be mapped to 72 REs (not shown) using extended cyclic prefixing. The RE can be a unit of one OFDM symbol 142 by one subcarrier (i.e., 15 kHz) 146. Each RE can transmit two bits 150a and 150b of information in case of quadrature phase shift keying (QPSK) modulation. Other types of modulation may be used as well. For instance, when bi-phase shift keying (BPSK) modulation is used, then only a single bit of information is transmitted.

Figure 2:
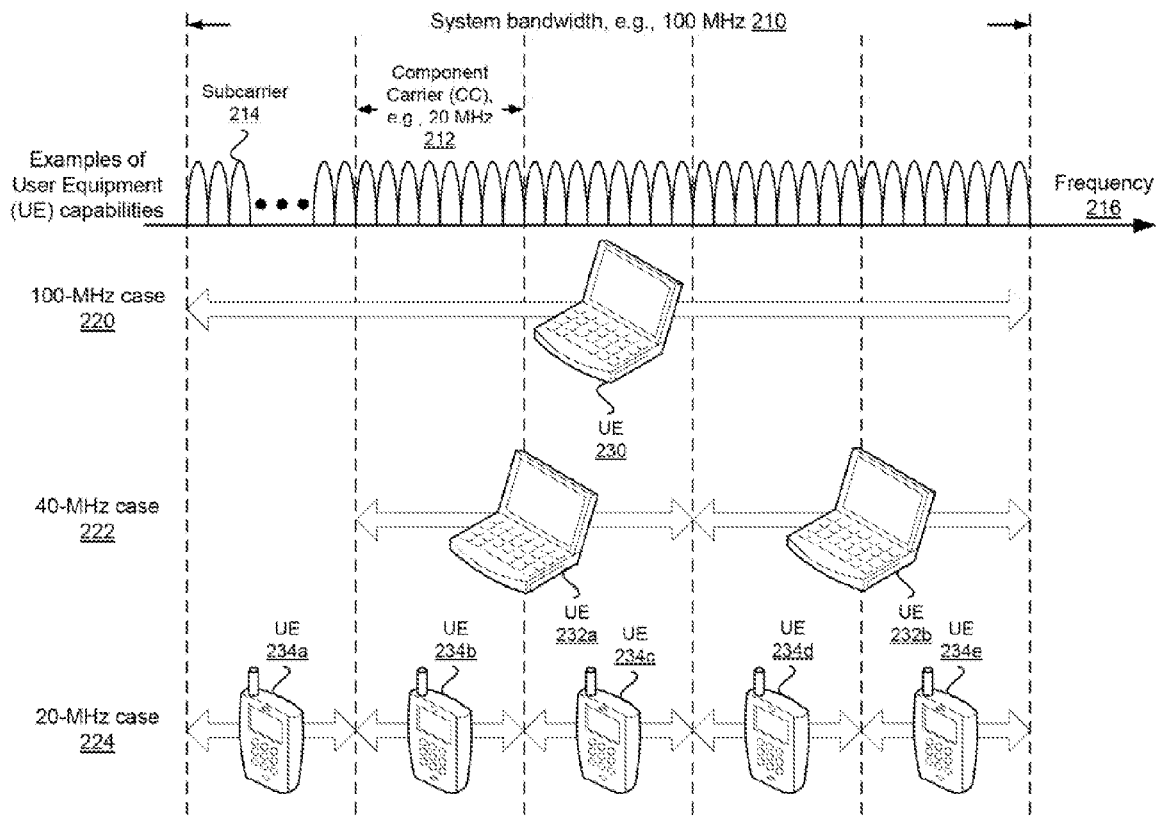
FIG. 2 illustrates a block diagram of carrier aggregation in accordance with an example.

In carrier aggregation (CA), CCs for a Universal Mobile Telecommunications System (UMTS) Terrestrial Radio Access Network can be combined together to form a larger bandwidth for the UE, as illustrated in FIG. 2. For example, the UMTS may have a system bandwidth 210 of 100 MHz in a frequency spectrum 216 with each CC 212 having a 20 MHz bandwidth. Each CC may comprise a plurality of subcarriers 214. Some UEs 230 may use the entire 100 MHz system bandwidth by aggregating five 20 MHz CCs together to achieve a 100 MHz UE bandwidth 220. In another example, two UEs 232a and 232b each with a 40 MHz bandwidth capability may each use two 20 MHz CCs together to achieve a 40 MHz UE bandwidth 222 for each UE. In another example, each UE 234a, 234b, 234c, 234d, and 234e may use a single 20 MHz CC to achieve a 20 MHz UE bandwidth 224. The CCs at an eNode B may be aggregated for some UEs while other UEs may use a single CC during the same interval. For example, one UE with a 40 MHz bandwidth may be configured while three UEs that each use a single 20 MHz CC are employed in a 100 MHz bandwidth system (not shown). Carrier aggregation allows the bandwidth for a UE to be adjusted and adapted based on the system limitations, the UEs capabilities and bandwidth requirements, the bandwidth available to the system and/or loading on the system.

Figure 3:
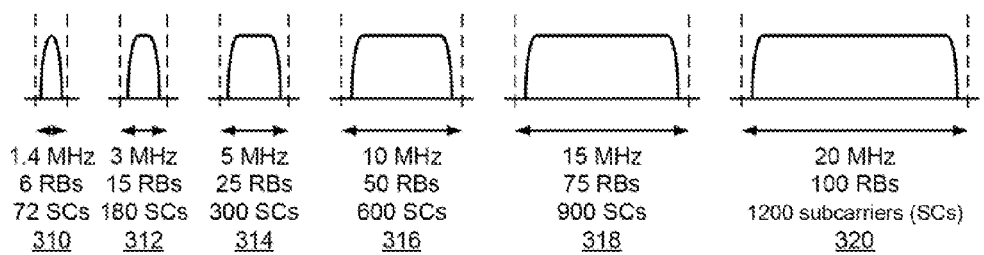
FIG. 3 illustrates a block diagram of component carrier (CC) bandwidths in accordance with an example.

Each UMTS may use a different carrier bandwidth, as illustrated in FIG. 3. For example, the LTE Release 8 (Rel-8) carrier bandwidths and Release 10 (Rel-10) CC bandwidths can include: 1.4 MHz 310, 3 MHz 312, 5 MHz 314, 10 MHz 316, 15 MHz 318, and 20 MHz 320. The 1.4 MHz CC can include 6 RBs comprising 72 subcarriers. The 3 MHz CC can include 15 RBs comprising 180 subcarriers. The 5 MHz CC can include 25 RBs comprising 300 subcarriers. The 10 MHz CC can include 50 RBs comprising 600 subcarriers. The 15 MHz CC can include 75 RBs comprising 900 subcarriers. The 20 MHz CC can include 100 RBs comprising 1200 subcarriers.

Figure 4:
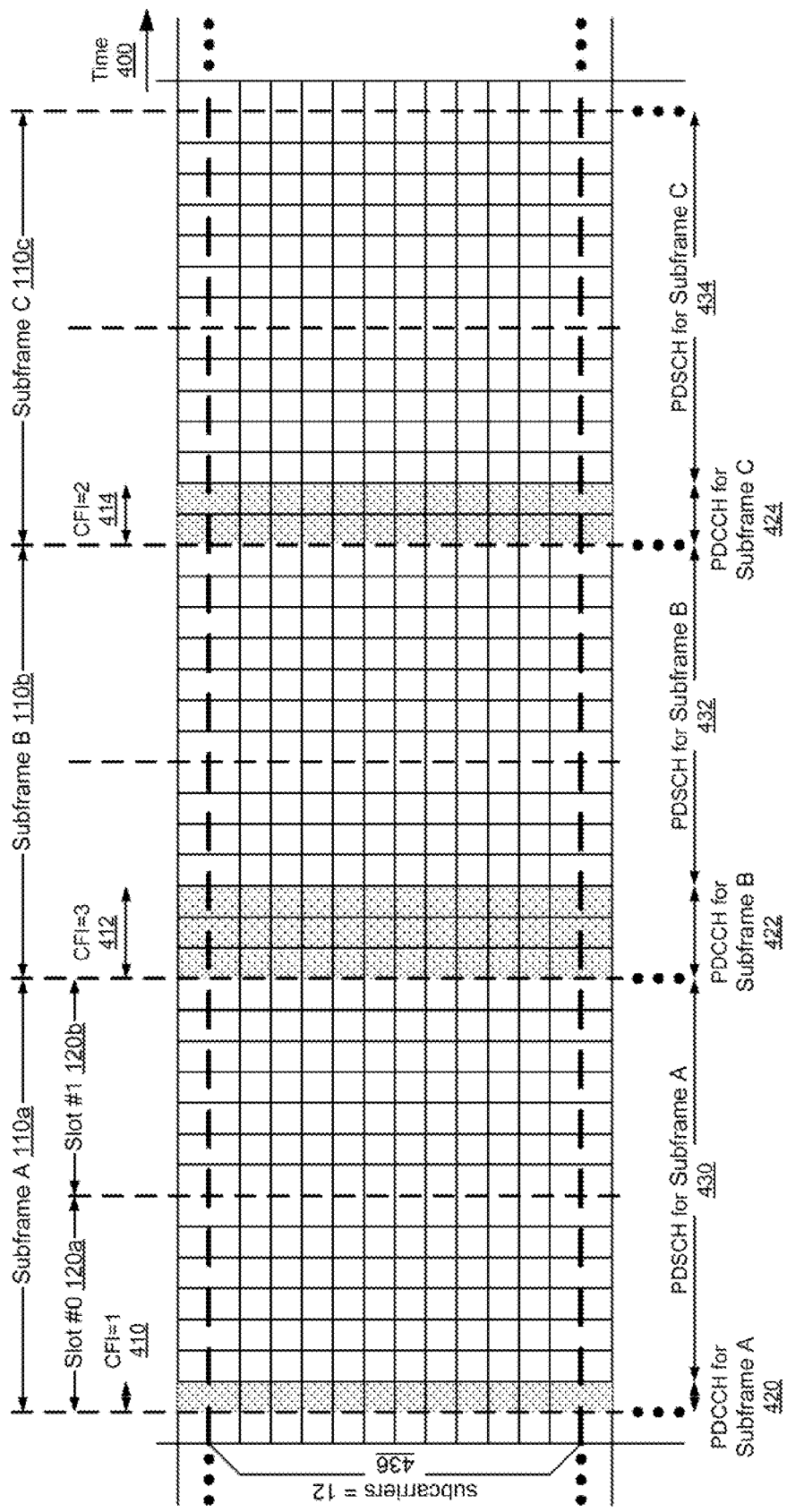
FIG. 4 illustrates a block diagram of a downlink channel structure in accordance with an example.

Each subframe of a CC may include downlink control information (DCI) found in a PDCCH, as illustrated in FIG. 4. The PDCCH in the control region may include one to three columns of the first OFDM symbols in each subframe or RB. The remaining 11 to 13 OFDM symbols in the subframe may be allocated to the PDSCH for data. The control region can include Physical Control Format Indicator Channel (PCFICH), physical hybrid automatic repeat request (hybrid-ARQ) indicator channel (PHICH), and the PDCCH. The control region has a flexible control design to avoid unnecessary overhead. The number of OFDM symbols in the control region used for the PDCCH can be determined by the control channel format indicator (CFI) transmitted in the Physical Control Format Indicator Channel (PCFICH). The PCFICH is located in the first OFDM symbol of each subframe. The PCFICH and PHICH can have priority over the PDCCH, so the PCFICH and PHICH are scheduled prior to the PDCCH.

The CFI and the PDCCH can be illustrated by the example of FIG. 4. Subframe A 110a, including slot #0 120a and slot #1 120b, has a CFI 410 equal to one indicating the first column of OFDM symbols in a CC's subframe A are used for the PDCCH 420 and the remaining 13 columns of OFDM symbols (in short cyclic prefixing) are used for the PDSCH 430. Each CC includes a plurality of subcarriers 436 mapped to a plurality of RBs. Subframe B 110b has a CFI 412 equal to three indicating the first three columns of OFDM symbols in a CC's subframe B are used for PDCCH 422 and the remaining 11 columns of OFDM symbols (in short cyclic prefixing) are used for PDSCH 432. Subframe C 110c has a CFI 414 equal to two indicating the first two columns of OFDM symbols in a CC's subframe C are used for PDCCH 424 and the remaining 12 columns of OFDM symbols (in short cyclic prefixing) are used for PDSCH 434. In the example illustrated in FIG. 4, the subframe A is followed by subframe B and subframe C in time 400.

Figures 5A, 5B:
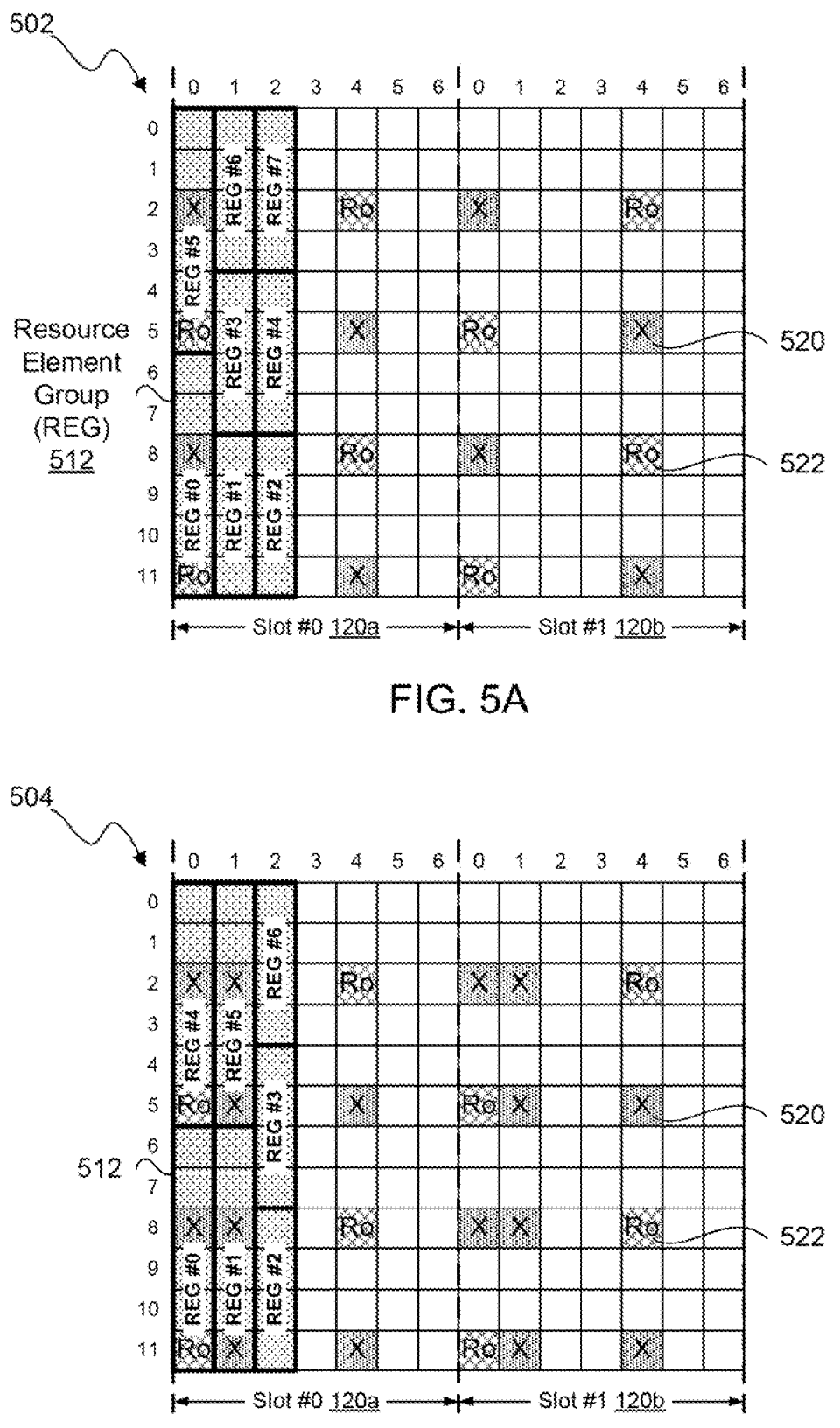

DCI can be mapped to the PDCCH using resource element groups (REGs) except both the PCFICH and PHICH, as illustrated in FIG. 5A. REGs can be used for defining the mapping of control channels to resource elements. A RB may include reference signal REs (reference signal OFDM symbols) 522 used for transmitting reference signals for a specific antenna port and unused REs (unused OFDM symbols) 520 not used for transmission on the specific port, which allow other antenna ports to transmit their reference signals. The number of reference signal REs and unused REs used in the RB can depend on the number of antenna ports. REGs can be used to map control channels to the remaining resource elements. REGs include a symbol quadruplet or four REs that do not include reference signal REs.

For example, a two antenna port configured RB 502 with a CFI=3 can include seven REGs 512 in the control region or seven REGs used for the PDCCH (if no REGs are used for PCFICH and PHICH), as illustrated in FIG. 5A. A four antenna port configured RB 504 with a CFI=3 can include six REGs in the control region or six REGs used for the PDCCH (if no REGs are used for PCFICH and PHICH), as illustrated in FIG. 5B. The REGs in the control region of the RBs for a CC can comprise the PDCCH. Each CCE used in the PDCCH can include 9 REGs. The PDCCH can be formed with one or more successive CCEs. A plurality of PDCCHs can be transmitted in a single subframe.

Figure 6A:
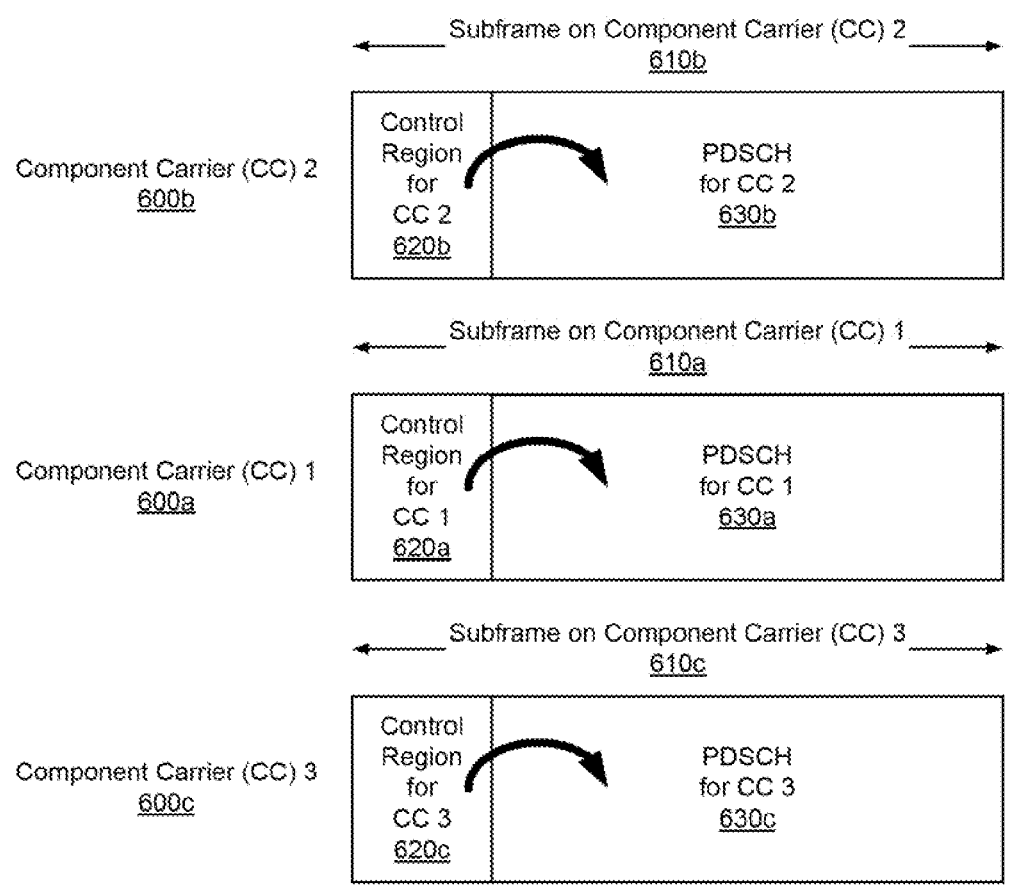
FIG. 6A illustrates a block diagram of scheduling component carrier (CC) data in accordance with an example.

The PDCCH in the control region of a subframe can provide DCI that informs the UE about scheduling on a CC related to downlink resource assignments on the PDSCH, uplink resource grants, and uplink power control commands. Each CC can provide scheduling in the PDCCH (in the control region) for the data in the PDSCH, as illustrated in FIG. 6A. A PDCCH in the control region 620a for CC 1 on CC 1 600a can provide the scheduling for a PDSCH 630a for CC 1 in a subframe 610a. A PDCCH in the control region 620b for CC 2 on CC 2 600b can provide the scheduling for a PDSCH 630b for CC2. A PDCCH in the control region 620c for CC 3 on CC 3 600c can provide the scheduling for a PDSCH 630c for CC3. The subframes 610a, 610b, and 610c for the CC 1, CC 2, and CC 3 may represent the same time duration. Each CC can provide its own PDCCH for the PDSCH scheduling.

Figure 6B:
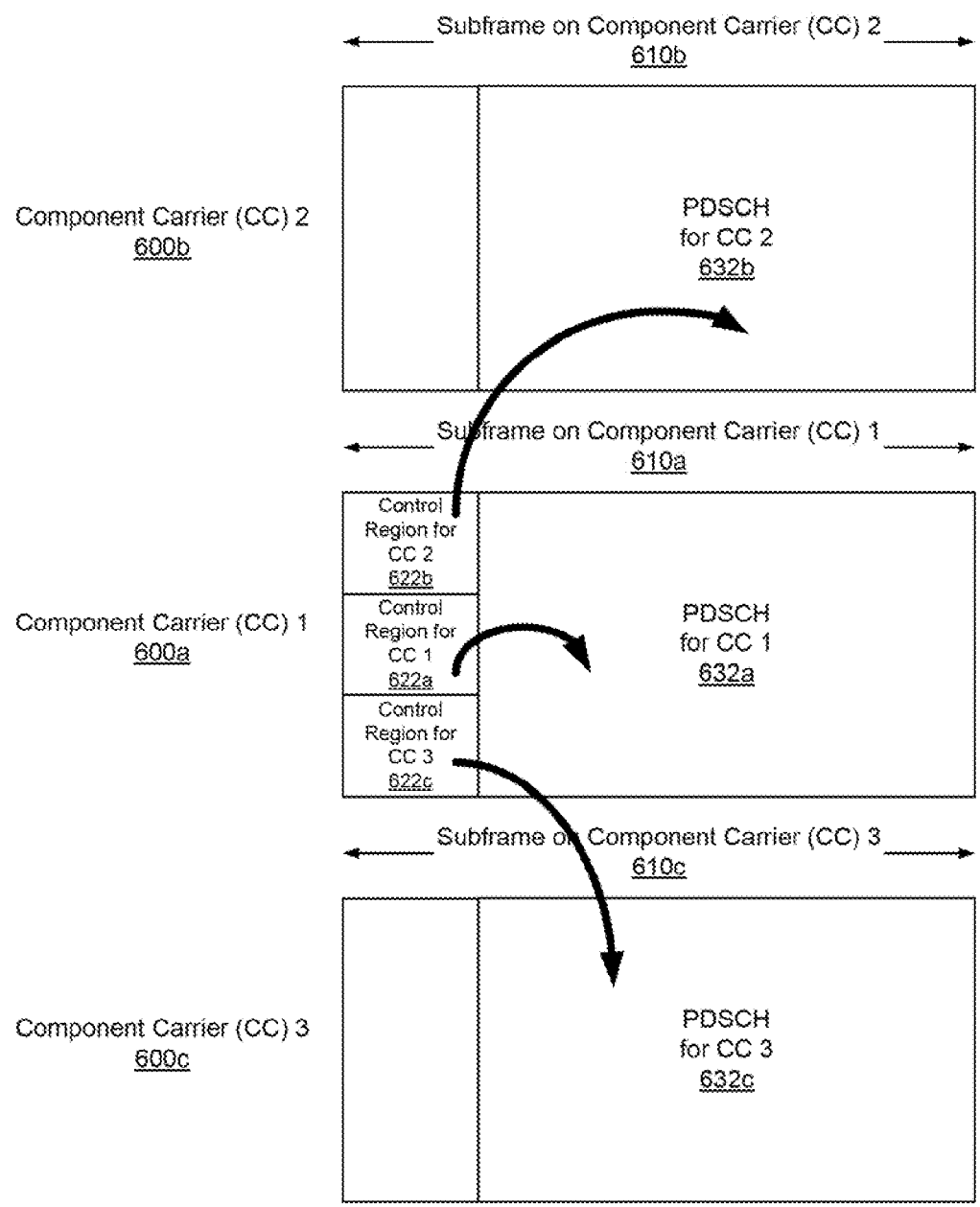
FIG. 6B illustrates a block diagram of cross carrier scheduling of data in accordance with an example.

In another example, one CC can provide the PDCCH for scheduling downlink resource assignments on the PDSCH of another CC, as illustrated in FIG. 6B. The DCI of one CC can be included or mapped to another CC's PDCCH. For example, the control region for CC 1 622a, the control region for CC 2 622b, and the control region for CC 3 622c can be contained in the PDCCH on CC 1 600a. The control region for CC 1 provides the scheduling for the PDSCH 632a on CC 1, the control region for CC 2 provides the scheduling for the PDSCH 632b on CC 2, and the control region for CC 3 provides the scheduling for the PDSCH 632c on CC 3. 3GPP LTE systems can provide for cross carrier scheduling of the PDSCH where the PDCCH is transmitted on a CC different from the CC transmitting the PDSCH.

The eNode B may schedule the CCEs in the PDCCH and code the DCI based on a predetermined process, and the UE may receive the transmission and may search for the DCI in the PDCCH and decode the DCI based on the predetermined process. The PDCCH can be formed with one or more successive CCEs. The total number of CCEs in the PDCCH can vary in every subframe k, where k∈{0,1,2,3,4,5,6,7,8,9}, of a radio frame. The number of CCEs in the PDCCH can be represented by $N_{CCE,k}$.

Figures 7A, 7B:
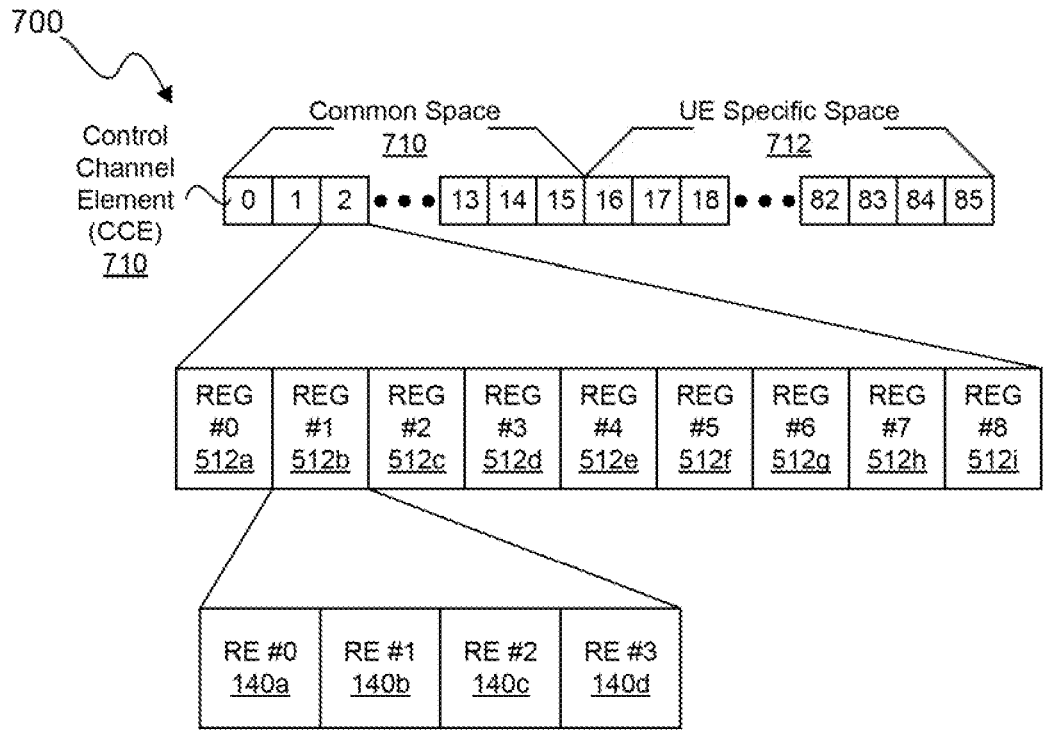
FIG. 7A illustrates a block diagram of control channel elements (CCEs) in a PDCCH search space in accordance with an example.
FIG. 7B illustrates a table with aggregation levels, sizes, and candidates of a PDCCH search space in accordance with an example.
Figure 8:
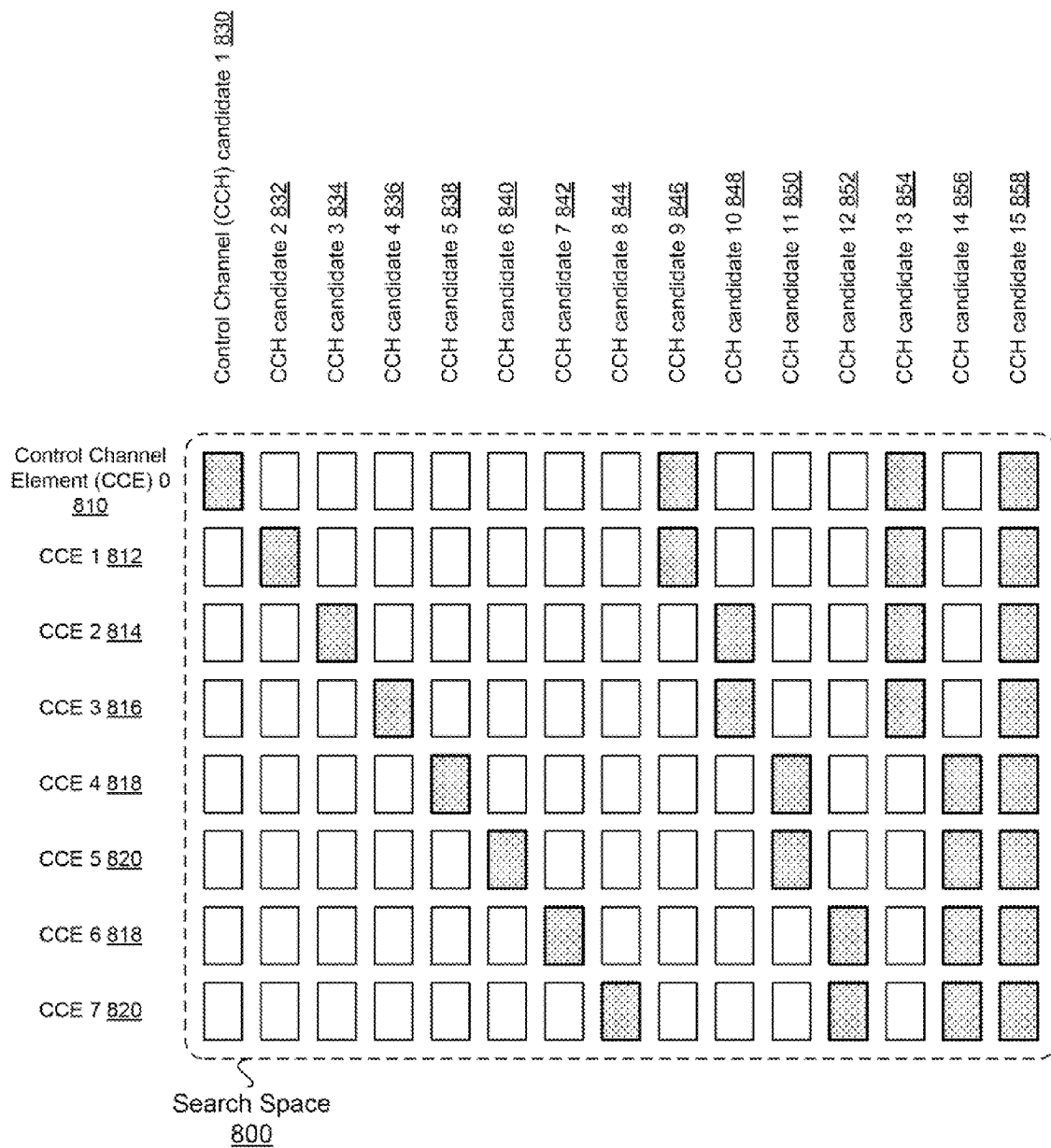
FIG. 8 illustrates a block diagram of control channel elements (CCEs) and candidates in a search space in accordance with an example.

For example, the PDCCH 700 can include 86 CCEs 710, as illustrated in FIG. 7A. Each CCE may include nine REGs 512a, 512b, 512c, 512d, 512e, 512f, 512g, 512h, and 512i. Each REG may include four REs 140a, 140b, 140c, and 140d.

The PDCCH can provide control information to multiple UEs in a cell for each subframe k. The UE can perform blind decoding since the UE may be aware of the detailed control channel structure, including the number of control channels (CCHs) and the number of CCEs to which each control channel is mapped. Multiple PDCCHs can be transmitted in a single subframe k which may or may not be relevant to a particular UE. Because the UE does not know the precise location of the DCI information in a PDCCH, the UE searches and decodes the CCEs in the PDCCH until the DCI is found for the UE's CCs. The PDCCH can be referred to as a search space. The UE finds the PDCCH specific to the UE (or the UE's CCs) by monitoring a set of PDCCH candidates (a set of consecutive CCEs on which the PDCCH could be mapped) in a PDCCH search space in each subframe.

The UE can use a Radio Network Temporary Identifier (RNTI) assigned to the UE by the eNode B to try and decode candidates. The RNTI can be used to demask a PDCCH candidate's cyclic redundancy check (CRC) that was originally masked by the eNode B using the UE's RNTI. If the PDCCH is for a specific UE, the CRC can be masked with a UE unique identifier, for example a Cell-RNTI (C-RNTI). If no CRC error is detected the UE can determine that a PDCCH candidate carries the DCI for the UE. If a CRC error is detected then the UE can determine that PDCCH candidate does not carry the DCI for the UE and the UE can increment to the next PDCCH candidate. The UE may increment to the next PDCCH candidate in the search space based on the CCE aggregation level. The CCE aggregation level will be discussed more fully in the following paragraphs.

To reduce the burden and improve the process performance of the UE, the PDCCH can be composed of a search space within the PDCCH to improve searching and decoding of the PDCCH candidates. Each search space can have a starting address determined by the RNTI. The PDCCH can be divided into a common search space 710, which can provide scheduling information for system information received by a group of UEs in a cell, and a UE specific space 712 allocated to control information for a particular UE. The common search space can be composed of the first 16 CCEs (CCE 0 through CCE 15) the remaining CCEs may to allocated to the UE specific space 712.

The number of CCEs used to transmit one piece of control information can be determined according to the receiving quality of the PDCCH allocated to a UE or the channel quality of the UE, and the number of CCEs is referred to as a CCE aggregation level or an aggregation level L∈{1,2,4,8}. The aggregation level can be used to determine the size of a search space or the number of CCEs forming a search space, and/or the number of control channel (CCH) candidates in a search space, as illustrated in table 702 of FIG. 7B.

In another example, if a search space 800 includes 8 CCEs 810, 812, 814, 816, 818, 820, 818, and 820, the total number of CCH candidates that can be decoded may be 15. Eight CCH candidates 830, 832, 834, 836, 838, 840, 842, and 844 can represent the candidates that can be decoded with an aggregation level of one (L=1). The UE can increment through the search space by the aggregation level until the DCI for the CCs of the UE is found. Four CCH candidates 846, 848, 850, and 852 can represent the candidates that can be decoded with an aggregation level of two (L=2). Two CCH candidates 854 and 856 can represent the candidates that can be decoded with an aggregation level of four (L=4). One CCH candidate 858 can represent the candidates that can be decoded with an aggregation level of eight (L=8). Searching and decoding the CCH candidates (PDCCH candidates) for the DCI in each subframe can be referred to as blind decoding.

Each decode takes a certain amount of time to process. The UE may have a limited number of blind decodes (for the candidates in the PDCCH) available in the timeframe allotted for decoding before the PDSCH or next subframe is transmitted for processing. For example, a UE may be able to handle up to 44 blind decodes before the PDSCH or next subframe is transmitted for processing. When the number (e.g., 300) of CCH candidates for an aggregation level is greater than a blind decode limit for the UE, then the UE may fail to obtain the CCH information and fail to process the PDSCH. Reducing the number of potential search spaces can be used to assist the UE to find and decode the DCI in the PDCCH efficiently and within an available time limit.

The 3GPP transport stream (TS) 36.2211 V8.4.0 defines a PDCCH allocation procedure for a search space $S_k^{(L)}$. A starting address of a UE specific search space that contains the DCI for a UE can be allocated by Equation 1 defined based on an aggregation level $L \in \{1,2,4,8\}$, where $Y_k$ is defined by Equation 2, $N_{CCE,k}$ is the total number of CCEs in a $k^{th}$ subframe ($k \in \{0,1,2,3,4,5,6,7,8,9\}$), $i=0, \ldots, L-1$ is a constant, $m=0, \ldots, M^{(L)}-1$, and $M^{(L)}$ is the number of PDCCH candidates to monitor in a given search space.

$$S_k^{(L)} = L \cdot \{(Y_k + m) \bmod \lfloor N_{CCE,k}/L \rfloor\} + i \quad \text{[Equation 1]}$$

The variable $Y_k$ is defined by Equation 2, where $Y_{-1} = n_{RNTI} \neq 0$, $n_{RNTI}$ is the RNTI number assigned to a UE, $A=39827$, $D=65537$, $k=\lfloor n_s/2 \rfloor$, and $n_s$ ($n \in \{0,1,2,3,4,5,6,7,8,9,10,11,12,13,14,15,16,17,18,19\}$) is the slot number within the radio frame.

$$Y_k = (A \cdot Y_{k-1}) \bmod D \quad \text{[Equation 2]}$$

The 3GPP TS 36.2211 V8.4.0 assignment procedure does not involve CC aggregation. 3GPP Rel-8 and Rel-9 do not support the scheduling of cross carriers and the UE is allocated one C-RNTI in CC aggregation. Using the RNTI and aggregation level of a UE maps the DCI of a UE to a single UE search space. As UE bandwidths increase, the number of PDCCH increase, the number of CCs increase, and the PDCCH search space sizes increase, then the number of decodes used to successfully decode PDCCH candidates will increase.

Instead of using a single search space for a UE, the search spaces may be further partitioned to decrease the search space size for a CC on a UE to reduce the number of blind decodes of PDCCH candidates and allow more efficient decoding of PDCCH candidates. In accordance with one embodiment of the present invention, the starting address of a UE specific search space can utilize the partial or full combinations of the transmission (TX) modes ($T_{c,m}$) for a carrier (c), the carrier index (CI) in the DCI format, and the DCI size (S) of different cross carriers. The total possible number of search spaces created using the method can be a product of the transmission (TX) modes ($T_{c,m}$) for a carrier (c), the carrier index (CI) in the DCI format, and the DCI size (S).

The eNode B can identify at least one value associated with each CC's PDCCH, where the at least one value represents at least one of a transmission mode for the CC, the carrier index in the DCI format, and/or the DCI size. The eNode B can assign or map the CC's control information (e.g., DCI) into CCEs in a search space based on the at least one value associated with the CC. The UE can receive the transmitted control channel (e.g., PDCCH) from the eNode B. The UE can search for the selected CC's control information in a search space using the CC's value and the CCE aggregation level for the UE receiving the selected CC. The UE can decode each control channel candidate in the search space until a validly decoded control channel candidate is decoded or until all validly decoded control channel candidates in a search space are decoded. The CC's control information, such as the DCI, may be obtained from the validly decoded control channel candidate.

In one embodiment, the eNode B can signal the transmission mode to the UE via a layer three communication link, such as Radio Resource Control (RRC) signaling, in advance of sending the PDCCH for a subframe. The transmission modes for PDSCH reception can include 8 modes: Mode 1 (single antenna port, port 0), mode 2 (transmit diversity), mode 3 (large-delay Cyclic Delay Diversity (CDD)), mode 4 (closed-loop spatial multiplexing), mode 5 (multi-user multiple-input and multiple-output (MU-MIMO)), mode 6 (closed loop spatial multiplexing, single layer), mode 7 (single antenna port, UE-specific reference signal (RS) (port 5)), and mode 8 (single or dual-layer transmission with UE-specific RS (ports 7 and/or 8)). The transmission mode can be changed per subframe via RRC signaling. Usually the transmission changes slowly. Changes in the transmission mode may be based on changes in the environment that the UE is operating. Each CC used by the UE can have independent transmission modes from other CCs. For a system with eight available transmission modes, up to eight additional search spaces for each UE may be partitioned using the transmission modes for scheduling and searching. The DCI size, which can also be used for scheduling and searching, can be related to transmission modes and can be determined from the transmission mode.

The carrier index (CI) can be CIF values or the index of sorted CIF values at the ascending order. The eNode B can configure the CIF values of each CC to UE via Radio Resource Control (RRC) signaling prior to the transmission of the PDCCH for the subframe. The CI can change depending on RRC reconfiguration. Other information transmitted by RRC signaling may also be used for scheduling and searching PDCCH search spaces.

The variable $Y_k$ can be modified to utilize at least one of the transmission modes ($T_{c,m}$), the carrier index (CI), and/or the DCI size (S) input parameters for the search space. Using an existing PDCCH assignment procedure and the transmission modes ($T_{c,m}$), $Y_k$ can be defined by Equation 3 to increase the number of starting addresses for search spaces based on the transmission mode, where $Y_{-1} = n_{RNTI} \neq 0$, $A=39827$, $D=65537$, $k=\lfloor n_s/2 \rfloor$, and $n_s$ is the slot number within the radio frame.

$$Y_k = [A \cdot (Y_{k-1} \pm f(T_{c,m}))] \bmod D \quad \text{[Equation 3]}$$

The $f(T_{c,m})$ can be a function of transmission modes for a carrier (c). The carrier (c) can be a CC used by the UE. The $f(T_{c,m})$ can be an integer based on the transmission modes ($T_{c,m}$). Equation 3 can be used to distinguish individual PDCCH search spaces for the different CCs in carrier aggregation. Equation 3 can specify that the PDCCHs with the same transmission modes can be located in a shared search space and the PDCCHs having different transmission modes can be located in an different shared search space. The DCI for a carrier may be allocated and mapped by an eNode B to CCEs in the PDCCH based on the transmission mode.

Figure 9:
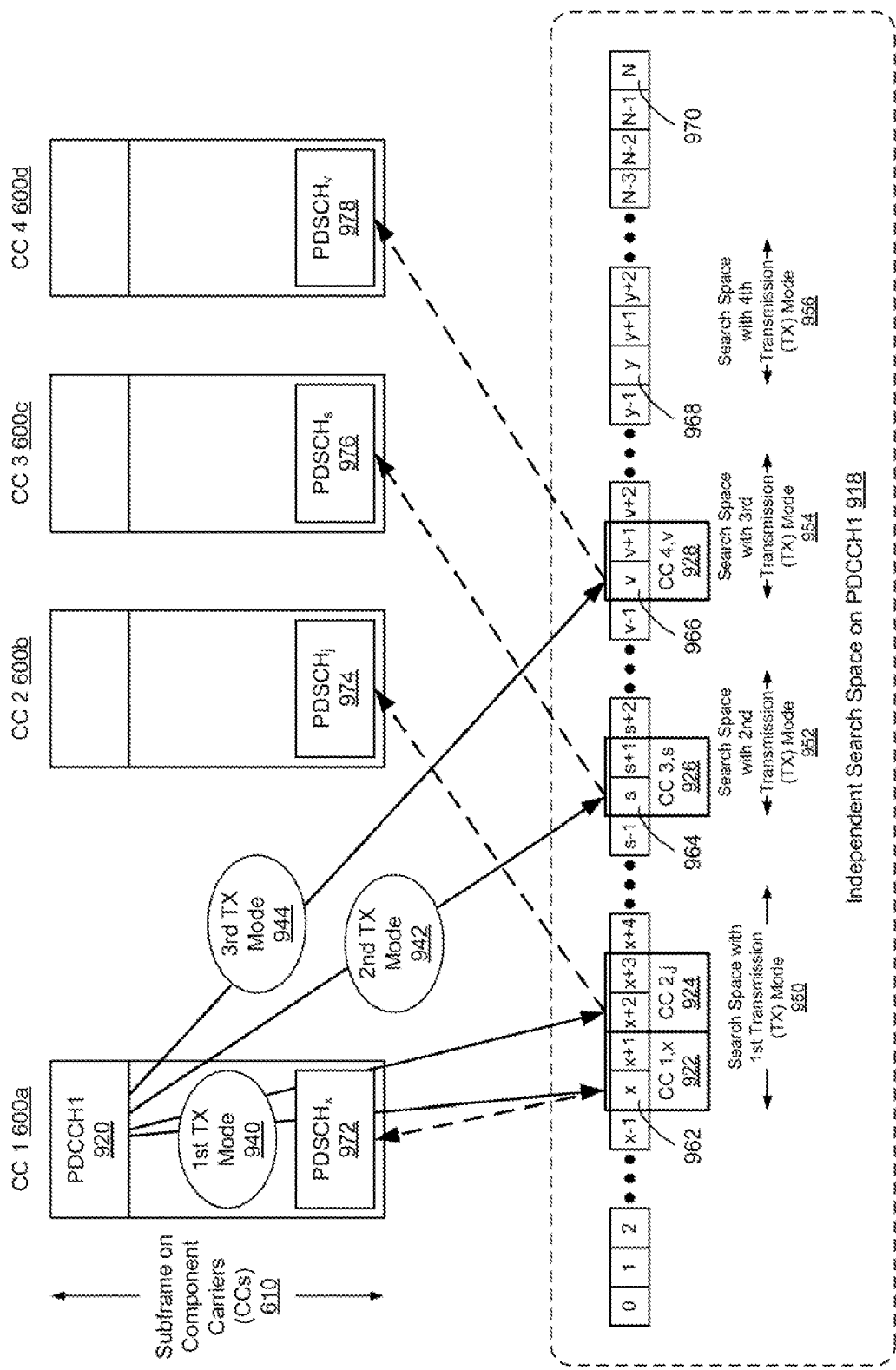
FIG. 9 illustrates a block diagram of a search space utilizing transmission modes in accordance with an example.

For example, the PDCCH on a subframe 610 for multiple CCs (600a-600d) may be transmitted by CC 1 660a, referred to as PDCCH1 920, as illustrated in FIG. 9. A first transmission mode search space 950 starting location for a 1st transmission mode 940 on an independent search space on PDCCH1 918 may be calculated to be at a CCE location x 962. The independent search space on PDCCH1 may have N CCEs ($N_{CCE,k}$) 970 for a subframe (k).

A PDCCH 922 for CC 1 with the first transmission mode may be assigned to the first transmission mode search space beginning at the CCE location x. The PDCCH for CC 1 can provide the PDSCH 972 scheduling for CC 1. A PDCCH 924 for CC 2 600b with the first transmission mode may be assigned to the first transmission mode search space 950 at a CCE location after the PDCCH for CC 1. The PDCCH for CC 2 can provide the PDSCH 974 scheduling for CC 2.

In one embodiment, the PDCCHs may be scheduled in a search space based on the order in which the PDCCHs are processed by an eNode B, and not necessarily based on a CC number or the RNTI. In another embodiment, the PDCCHs with the same transmission mode may be assigned to a search space in any order determined by the eNode B.

A second transmission mode search space 952 starting location for a second transmission mode 942 on the independent search space on PDCCH1 may be calculated to be at a CCE location s 964. A PDCCH 926 for CC 3 660c having the second transmission mode may be assigned to the second transmission mode search space beginning at the CCE location s. The PDCCH for CC 2 can provide the PDSCH 976 scheduling for CC 3. A third transmission mode search space 954 starting location for a third transmission mode 944 on the independent search space on PDCCH1 918 may be calculated to be at a CCE location v 966. A PDCCH 928 for CC 4 600d with the third transmission mode may be assigned to the third transmission mode search space beginning at the CCE location v. The PDCCH for CC 4 can provide the PDSCH 978 scheduling for CC 4. A fourth transmission mode search space 954 with a starting location for a fourth transmission mode on the independent search space on PDCCH1 may be calculated to be at a CCE location y 968 when a PDCCH for a fourth transmission mode is used. In the illustration of FIG. 9, the PDCCHs for the CCs have an aggregation level of two. The first transmission mode, the second transmission mode, the third transmission mode, and the fourth transmission mode does not refer to a mode 1, a mode 2, a mode 3, a mode 4, but the terms first, second, third, and fourth are used to distinguish between the available transmission mode that is used.

The UE may search the independent search space on PDCCH1 918 for the PDCCH for each CC using the existing PDCCH searching procedure and the transmission modes ($T_{c,m}$). The transmission mode for a CC can be transmitted to the UE by RRC signaling prior to the subframe transmission. The PDCCH 922 for CC 1 600a can be searched in the first transmission mode search space 950 until the DCI for the CC 1 is validly decoded. Likewise, the PDCCH 924 for CC 2 600b can be searched in the first transmission mode search space, the PDCCH 926 for CC 3 600c can be searched in the second transmission mode search space 952, and the PDCCH 928 for CC 3 600c can be searched in the third transmission mode search space 954.

Figure 10:
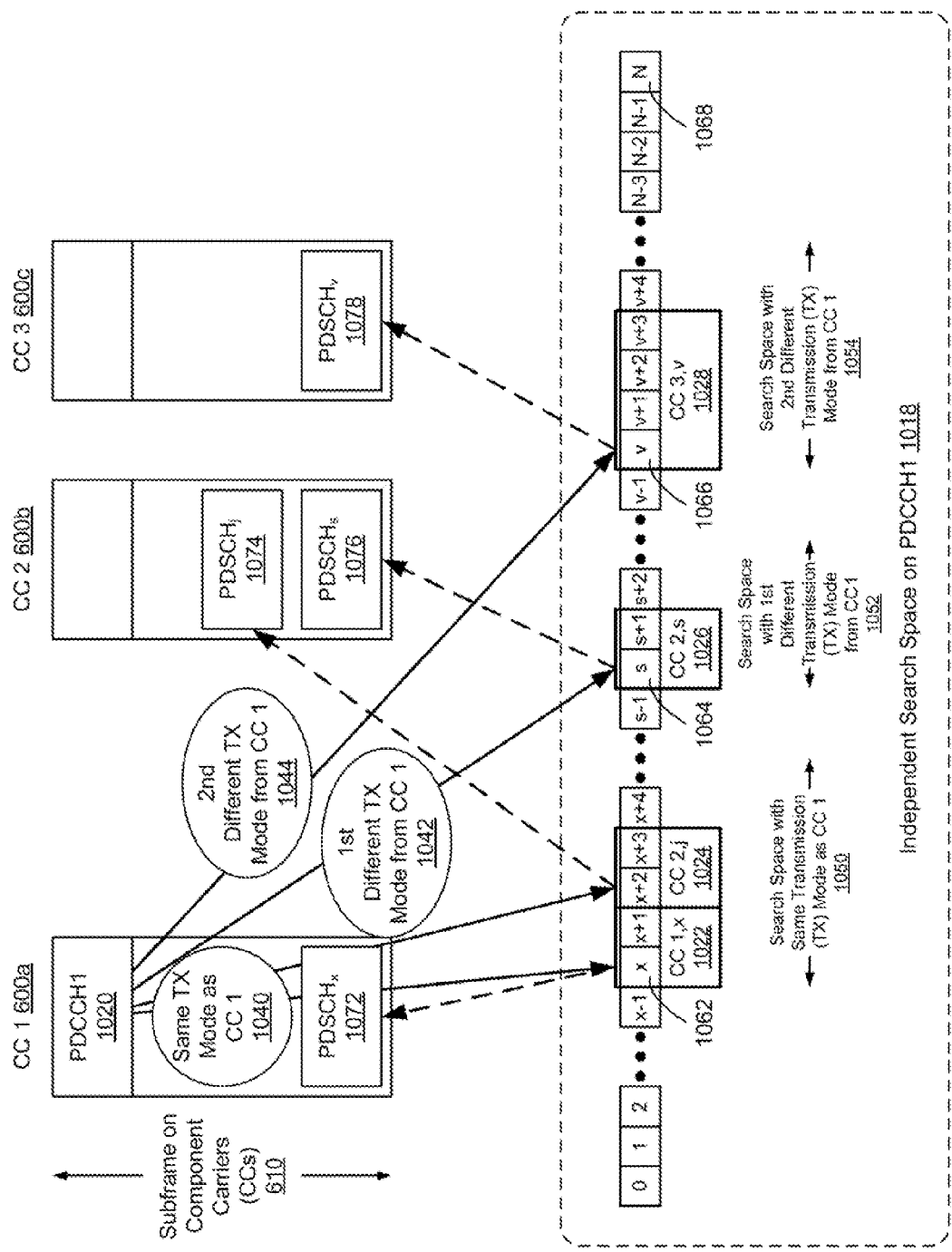
FIG. 10 illustrates a block diagram of a search space utilizing transmission modes in accordance with an example.

In another example, the PDCCH for a subframe 610 for multiple CCs (600a-600c) may be transmitted by CC 1 660a, referred to as PDCCH1 1020, as illustrated in FIG. 10. A same transmission mode search space 1050 starting location for a same transmission mode 1040 as CC 1 on an independent search space on PDCCH1 1018 may be calculated to be at a CCE location x 1062. The independent search space on PDCCH1 may have N CCEs ($N_{CCE,k}$) 1068 for a subframe (k). A PDCCH 1022 for CC 1 with the same transmission mode as CC 1 may be assigned to the same transmission mode search space beginning at the CCE location x. The PDCCH for CC 1 can provide the PDSCH 1072 scheduling for CC 1.

A first PDCCH 1024 for CC 2 600b with the same transmission mode as CC 1 may be assigned to the same transmission mode search space 1050 at a CCE location after the PDCCH for CC 1, such as x+2 in this example. The first PDCCH for CC 2 can provide the first PDSCH 1074 scheduling for CC 2. A first different transmission mode search space 1052 starting location for a first different transmission mode 1042 that is different from the transmission mode of CC 1 on the independent search space on PDCCH1 1018 may be calculated to be at a CCE location s 1064. A second PDCCH 1026 for CC 2 with the first different transmission mode may be assigned to the first different transmission mode search space beginning at the CCE location s. The second PDCCH for CC 2 can provide the second PDSCH 1076 scheduling for CC 2.

A second different transmission mode search space 1054 having a starting location for a second different transmission mode 1044 that is different from the transmission mode of CC 1 on the independent search space on PDCCH1 may be calculated to start at a CCE location v 1066. A PDCCH 1028 for CC 3 600c with the second different transmission mode may be assigned to the second different transmission mode search space beginning at the CCE location v 1066. The PDCCH for CC 3 may have an aggregation level of four. The PDCCH for CC 3 can provide the PDSCH 1078 scheduling for CC 3.

The variable $Y_k$ can be modified to utilize the transmission modes ($T_{c,m}$) and the carrier index (CI) input parameters to further segment the search space. Using an existing PDCCH assignment procedure, the transmission modes ($T_{c,m}$), and the carrier index (CI), $Y_k$ can be defined by equation 4 to increase the number of starting addresses for search spaces based on the transmission mode and CI, where $Y_{-1}=n_{RNTI}\neq 0$, A=39827, D=65537, k=$\lfloor n_s/2 \rfloor$, and $n_s$ is the slot number within the radio frame.

$$Y_k=[A\cdot(Y_{k-1}+f(CI,T_{c,m}))] \bmod D \qquad \text{[Equation 4]}$$

The $f(CI, T_{c,m})$ can be a function of transmission modes for a carrier (c) and the carrier index (CI) in the DCI formats. The $f(CI,T_{c,m})$ can be an integer based on the transmission modes ($T_{c,m}$) and the carrier index (CI). The DCI for a carrier may be allocated and mapped by an eNode B to CCEs in the PDCCH based on the transmission mode and the carrier index.

Figure 11:
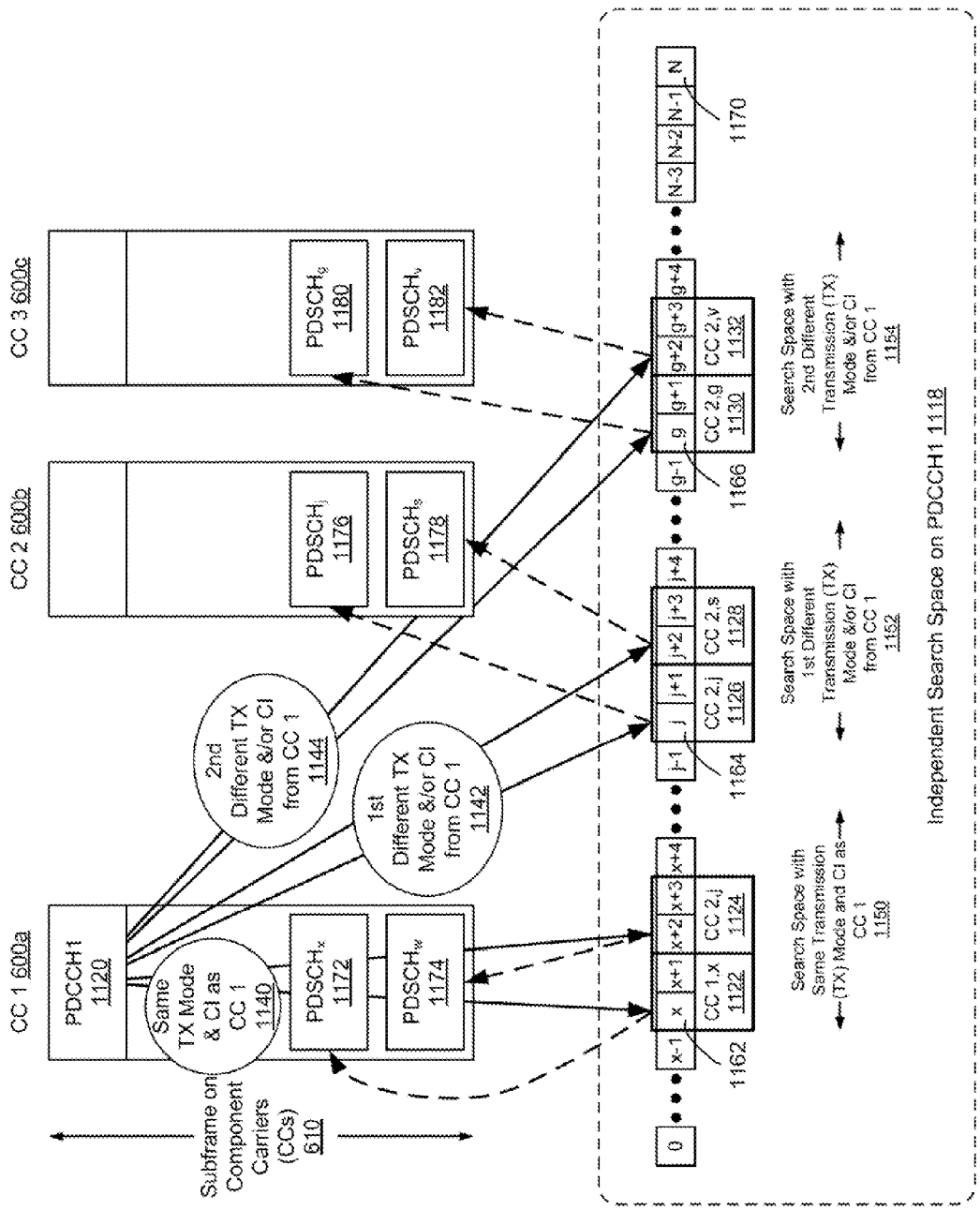
FIG. 11 illustrates a block diagram of a search space utilizing transmission modes and carrier indexes (Cis) in accordance with an example.

For example, the PDCCH on a subframe 610 for multiple CCs may be transmitted by CC 1 600a, referred to as PDCCH1 1120, as illustrated in FIG. 11. A same transmission mode and carrier index search space 1150 starting location for a same transmission mode and carrier index 1140 as CC 1 on an independent search space on PDCCH1 1118 may be calculated to be at a CCE location x 1162. The independent search space on PDCCH1 may have N CCEs ($N_{CCE,k}$) 1170 for a subframe (k). A first PDCCH 1122 for CC 1 with the same transmission mode and carrier index as CC 1 may be assigned to the same transmission mode and carrier index search space beginning at the CCE location x. The first PDCCH for CC 1 can provide the first PDSCH 1172 scheduling for CC 1. A second PDCCH 1124 for CC 1 with the same transmission mode and carrier index as CC 1 may be assigned to the same transmission mode and carrier index search space at the CCE location after the first PDCCH for CC 1. The second PDCCH for CC 1 can provide the second PDSCH 1174 scheduling for CC 1.

A first different transmission mode and/or carrier index search space 1152 starting location for a first different transmission mode and/or carrier index 1142 different from the transmission mode and/or carrier index of CC 1 on the independent search space on PDCCH1 may be calculated to be at a CCE location j 1164. A first PDCCH 1126 for CC 2 600b with the different transmission mode and/or carrier index as CC 1 may be assigned to the first different transmission mode and/or carrier index search space beginning at the CCE location j. The first PDCCH for CC 2 can provide the first PDSCH 1176 scheduling for CC 2. A second PDCCH 1128 for CC 2 with the first different transmission mode and/or carrier index may be assigned to the first different transmission mode and/or carrier index search space at the CCE location after the first PDCCH for CC 2. The second PDCCH for CC 2 can provide the second PDSCH 1178 scheduling for CC 2.

A second different transmission mode and/or carrier index search space 1154 starting location for a second different transmission mode and/or carrier index 1144 different from the transmission mode and/or carrier index of CC 1 on the independent search space on PDCCH1 may be calculated to be at a CCE location g 1166. A first PDCCH 1130 for CC 3 600*c* with the second transmission mode and/or carrier index may be assigned to the second transmission mode and/or carrier index search space beginning at the CCE location g. The first PDCCH for CC 3 can provide the first PDSCH 1180 scheduling for CC 3. A second PDCCH 1132 for CC 3 with the second different transmission mode and/or carrier index may be assigned to the second different transmission mode and/or carrier index search space at the CCE location after the first PDCCH for CC 3. The second PDCCH for CC 3 can provide the second PDSCH 1182 scheduling for CC 3. In the illustration of FIG. 11, the PDCCHs for the CCs have an aggregation level of two.

The variable $Y_k$ can be modified to utilize the transmission modes ($T_{c,m}$), the carrier index (CI), and the DCI size (S) input parameters for the search space. Using an existing PDCCH assignment procedure, the transmission modes ($T_{c,m}$), the carrier index (CI), and the DCI size (S), $Y_k$ can be defined by Equation 5 to increase the number of starting addresses for a search spaces based on the transmission mode, CI, and S, where $Y_{-1}=n_{RNTI}\neq 0$, A=39827, D=65537, $k=\lfloor n_s/2 \rfloor$, and $n_s$ is the slot number within the radio frame.

$$Y_k = [A \cdot (Y_{k-1} + f(CI, T_{c,m}, S))] \bmod D \qquad \text{[Equation 5]}$$

The $f(CI, T_{c,m}, S)$ can be a function of transmission modes $T_{c,m}$ for a carrier (c), the carrier index (CI) in the DCI formats, and the DCI size (S). The $f(CI, T_{c,m}, S)$ can be an integer based on the transmission modes ($T_{c,m}$), the carrier index (CI), and the DCI size (S). The DCI for a carrier may be allocated and mapped by an eNode B to CCEs in the PDCCH based on the transmission mode, the carrier index, and the DCI size.

Figure 12:
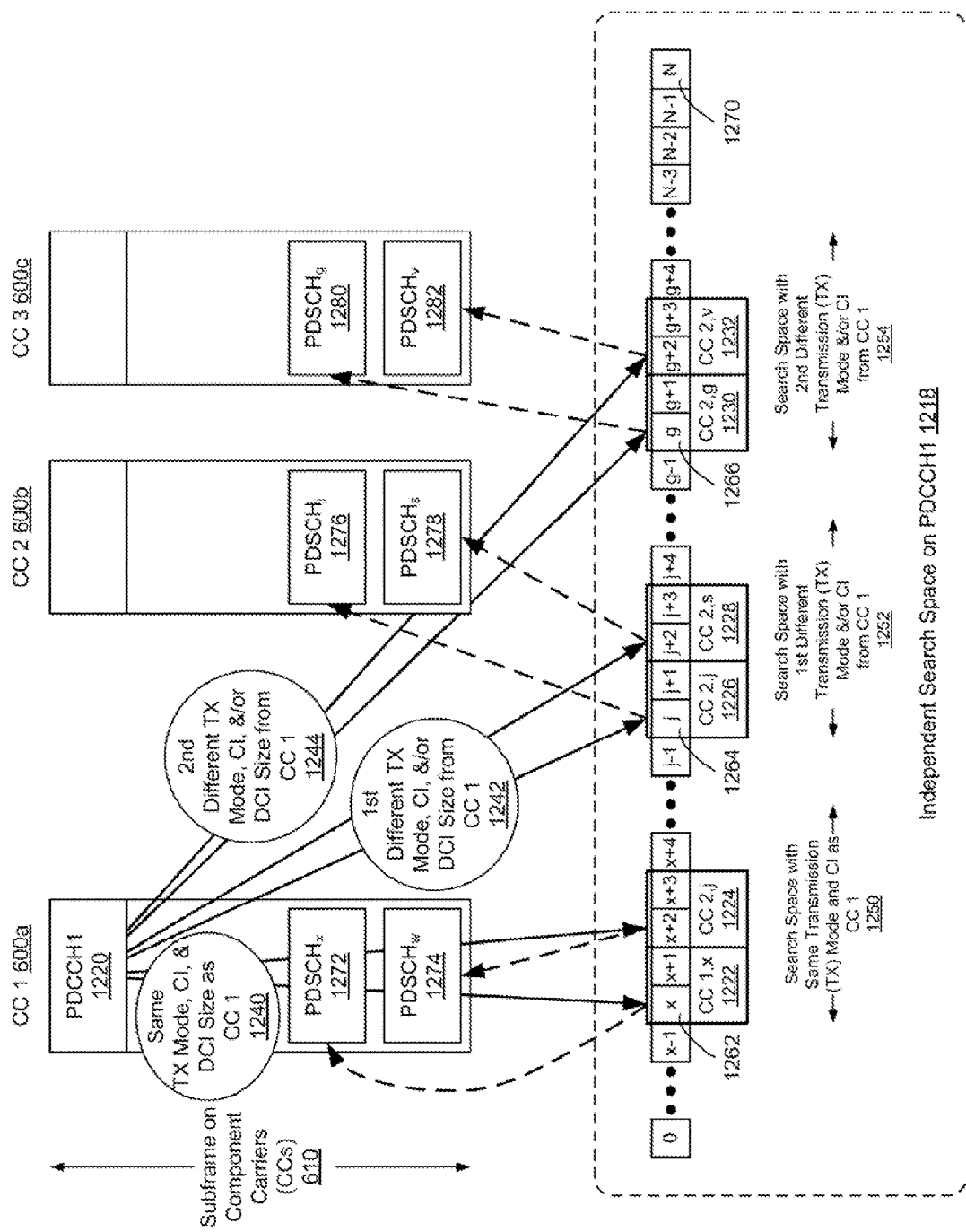
FIG. 12 illustrates a block diagram of a search space utilizing transmission modes, carrier indexes (Cis), and downlink control information (DCI) sizes in accordance with an example.

For example, the PDCCH for a subframe 610 on multiple CCs may be transmitted by CC 1 600*a*, referred to as PDCCH1 1220, as illustrated in FIG. 12. A same transmission mode, carrier index, and DCI size search space 1250 starting location for a same transmission mode, carrier index, and DCI size 1240 as CC 1 on an independent search space on PDCCH1 1218 may be calculated to be at a CCE location x 1262. The independent search space on PDCCH1 may have N CCEs ($N_{CCE,k}$) 1270 for a subframe (k). A first PDCCH 1222 for CC 1 with the same transmission mode, carrier index, and DCI size as CC 1 may be assigned to the same transmission mode, carrier index, and DCI size search space beginning at the CCE location x. The first PDCCH for CC 1 can provide the first PDSCH 1272 scheduling for CC 1. A second PDCCH 1224 for CC 1 with the same transmission mode, carrier index, and DCI size as CC 1 may be assigned to the same transmission mode, carrier index, and DCI size search space at the CCE location after the first PDCCH for CC 1. The second PDCCH for CC 1 can provide the second PDSCH 1274 scheduling for CC 1.

A first different transmission mode, carrier index, and/or DCI size search space 1252 starting location for a first different transmission mode, carrier index, and/or DCI size 1242 different from the transmission mode and/or carrier index of CC 1 on the independent search space on PDCCH1 may be calculated to be at a CCE location j 1264. A first PDCCH 1226 for CC 2 600*b* with the different transmission mode, carrier index, and/or DCI size as CC 1 may be assigned to the first different transmission mode, carrier index, and/or DCI size search space beginning at the CCE location j. The first PDCCH for CC 2 can provide the first PDSCH 1276 scheduling for CC 2. A second PDCCH 1228 for CC 2 with the first different transmission mode, carrier index, and/or DCI size may be assigned to the first different transmission mode, carrier index, and/or DCI size search space at the CCE location after the first PDCCH for CC 2. The second PDCCH for CC 2 can provide the second PDSCH 1278 scheduling for CC 2.

A second different transmission mode, carrier index, and/or DCI size search space 1254 starting location for a second different transmission mode, carrier index, and/or DCI size 1244 different from the transmission mode and/or carrier index of CC 1 on the independent search space on PDCCH1 may be calculated to be at a CCE location g 1266. A first PDCCH 1230 for CC 3 600*c* with the second transmission mode, carrier index, and/or DCI size may be assigned to the second transmission mode, carrier index, and/or DCI size search space beginning at the CCE location g. The first PDCCH for CC 3 can provide the first PDSCH 1280 scheduling for CC 3. A second PDCCH 1232 for CC 3 with the second different transmission mode, carrier index, and/or DCI size may be assigned to the second different transmission mode, carrier index, and/or DCI size search space at the CCE location after the first PDCCH for CC 3. The second PDCCH for CC 3 can provide the second PDSCH 1282 scheduling for CC 3. In the illustration of FIG. 12, the PDCCHs for the CCs have an aggregation level of two.

Figure 13:
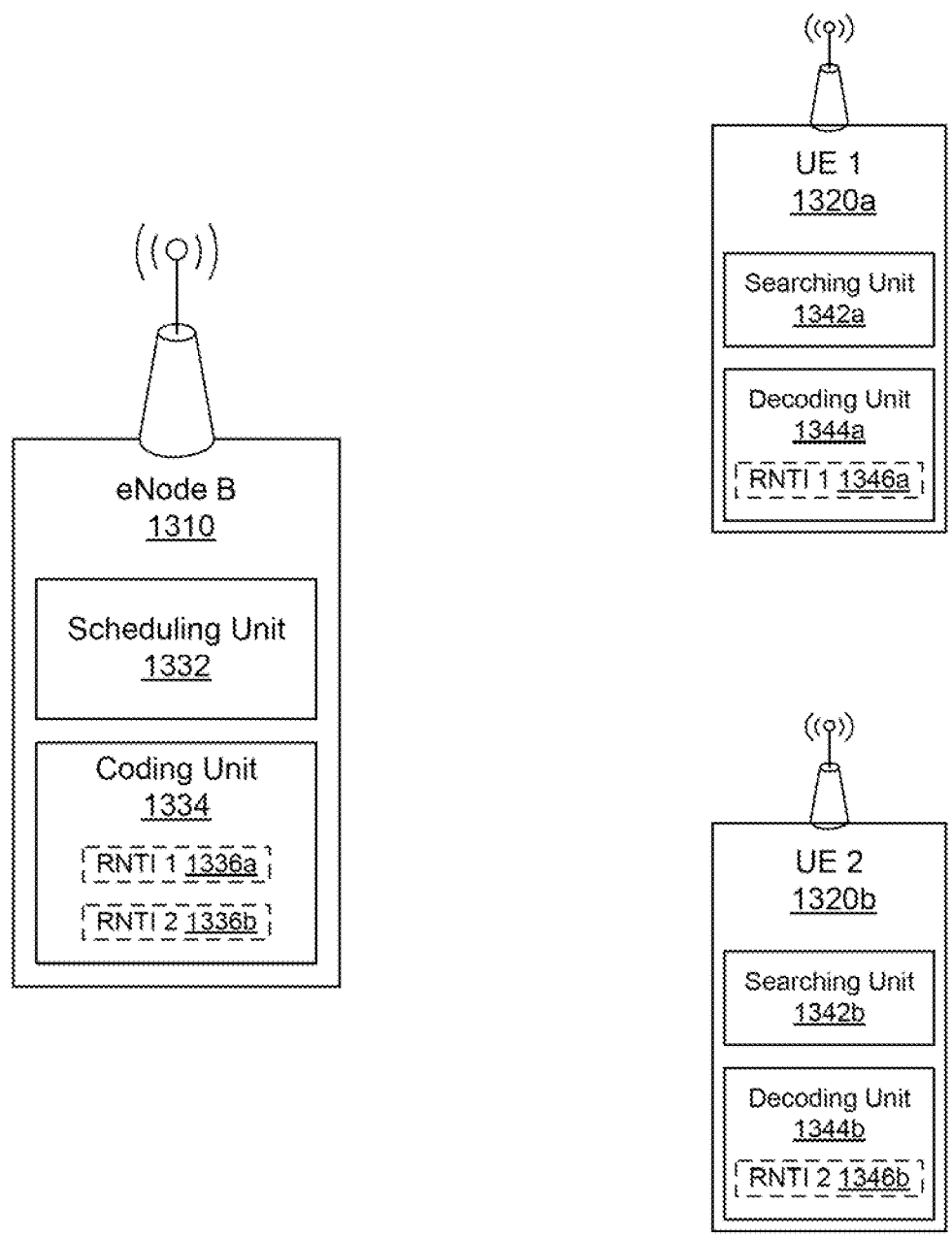
FIG. 13 illustrates a block diagram of an evolved Node B (eNode B or eNB) and user equipments (UEs) in accordance with an example.

In another example illustrated by FIG. 13, an eNode B 1310 includes a coding unit 1334 and a scheduling unit 1332. The coding unit may map the PDCCH bits from a DCI message after performing CRC attachment (using each UE's RNTI 1336*a* and 1136*b*), channel coding, and rate matching. The scheduling unit may use the UE's RNTI, the UE's aggregation level, the transmission mode for each of the UE's CC, the carrier index for each of the UE's CC, and/or the DCI size to schedule the CCEs of a PDCCH in a search space. The PDCCH can then be transmitted to the UEs. The UEs 1320*a* and 1320*b* can have a searching unit 1342*a* and 1342*b* and a decoding unit 1342*a* and 1342*b*, respectively, for blind decoding a PDCCH search space. Each UE may use the UE's RNTI 1346*a* and 1346*b* assigned by the eNode B to de-mask or decode the PDCCH candidates in a search space.

Figure 14:
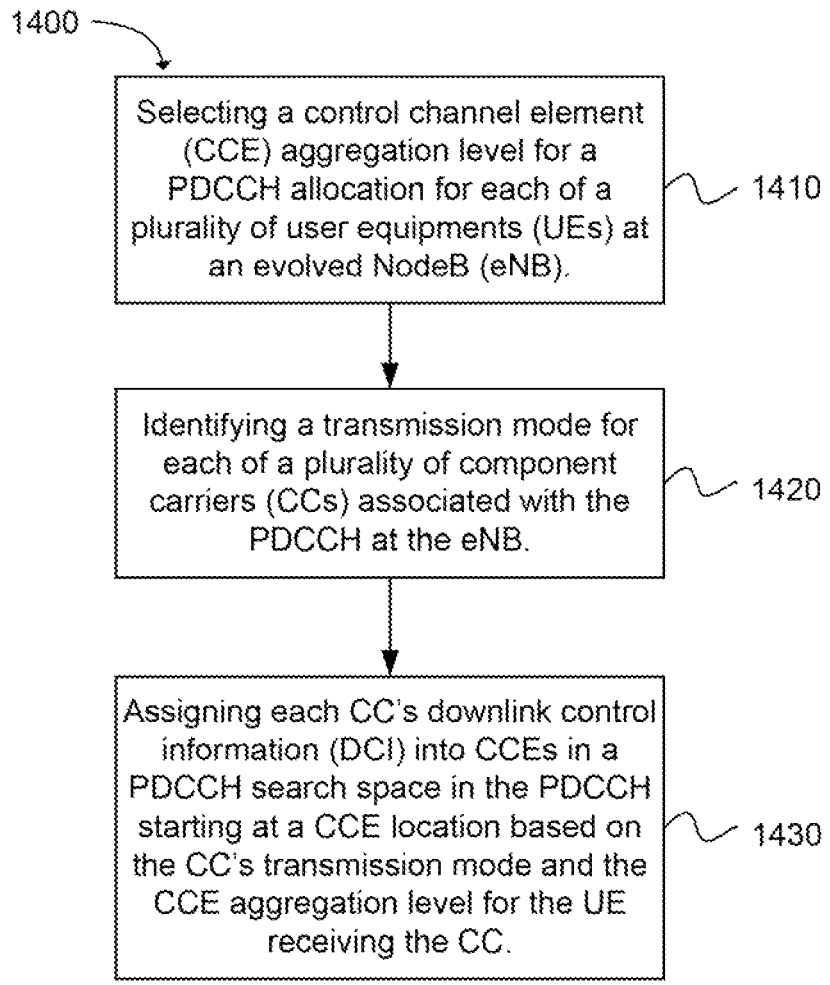
FIG. 14 depicts a flow chart of a method for allocating a physical downlink control channel (PDCCH) to reduce a number of PDCCH candidates in a search space on a user equipment (UE) in accordance with an example.

Another example provides a method 1400 for allocating a PDCCH to reduce a number of PDCCH candidates in a search space for carrier aggregation on a UE, as shown in the flow chart in FIG. 14. The method includes the operation of selecting 1410 a control channel element (CCE) aggregation level for a PDCCH allocation for each of a plurality of UEs at an eNode B. The operation of identifying 1420 a transmission mode for each of a plurality of CCs associated with the PDCCH at the eNode B follows. The next operation of the method may be assigning 1430 each CC's DCI into CCEs in a PDCCH search space in the PDCCH starting at a CCE location based on the CC's transmission mode and the CCE aggregation level for the UE receiving the CC.

The method and system for allocating a PDCCH to reduce a number of PDCCH candidates in a search space for carrier aggregation on a UE may be implemented using a computer readable medium having executable code embodied on the medium. The computer readable program code may be configured to provide the functions described in the method.

The computer readable medium may be a RAM, EPROM, flash drive, optical drive, magnetic hard drive, or other medium for storing electronic data. Additionally, the method and system for allocating a PDCCH to reduce a number of PDCCH candidates in a search space for carrier aggregation on a UE may be downloaded as a computer program product transferred from a server or eNode B to a requesting or wireless device by way of machine readable data signals embodied in a carrier wave or other propagation medium.

Various techniques, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" means that a particular feature, structure, or characteristic described in connection with the example is included in at least one embodiment of the present invention. Thus, appearances of the phrases "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of search spaces, to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A method for allocating a control channel to reduce a number of control channel candidates in a search space for carrier aggregation in a mobile communication system, comprising:
   selecting a control channel element (CCE) aggregation level for a control information allocation for a user equipment (UE) at an evolved NodeB (eNB);
   identifying a value selected from at least one of a transmission mode of each of a plurality of component carriers (CCs), a carrier index (CI) in a downlink control information (DCI) format for of each of the plurality of CCs, and a DCI size of each of the plurality of CC's control information determined by the transmission mode, wherein each CC is associated with a physical downlink control channel (PDCCH), wherein the value is received from Radio Resource Control (RRC) signaling related to each CC; and
   assigning, at the eNB, each CC's control information into CCEs in a search space in the control channel starting at a CCE location based on a value identified for a CC and the CCE aggregation level for the UE receiving the CC.

2. The method of claim 1, further comprising:
receiving the control channel at the UE;
searching for a selected CC's control information in a search space by identifying the starting CCE location based on the value identified for the CC;
decoding each control channel candidate in the search space beginning at the starting CCE location until a validly decoded control channel candidate is decoded; and
obtaining the selected CC's control information from the validly decoded control channel candidate.

3. A method for allocating a physical downlink control channel (PDCCH) to reduce a number of PDCCH candidates in a search space for carrier aggregation on a user equipment (UE), comprising:
selecting a control channel element (CCE) aggregation level for a PDCCH allocation for each of a plurality of user equipments (UEs) at an evolved NodeB (eNB);
identifying a transmission mode received via radio resource control (RRC) signalling for each of a plurality of component carriers (CCs) associated with the PDCCH at the eNB; and
assigning each CC's downlink control information (DCI) into CCEs in a PDCCH search space in the PDCCH at a CCE starting location that is selected based on the CC's transmission mode and the CCE aggregation level for the UE receiving the CC.

4. The method of claim 3, further comprising:
receiving the PDCCH at the UE;
searching for a selected CC's DCI in the PDCCH search space by identifying the starting CCE location based on the selected CC's transmission mode and the CCE aggregation level for the UE receiving the selected CC;
decoding each PDCCH candidate in the PDCCH search space beginning at the CCE starting location until a validly decoded PDCCH candidate is decoded; and
obtaining the selected CC's DCI from the validly decoded PDCCH candidate.

5. The method of claim 4, wherein decoding each PDCCH candidate in the PDCCH search space further comprises:
incrementing to a next PDCCH candidate by a number of CCEs determined by the CCE aggregation level.

6. The method of claim 4, further comprising:
receiving the selected CC at the UE, wherein the selected CC's DCI is included on another CC's PDCCH.

7. The method of claim 4, further comprising determining the selected CC's transmission mode via radio resource control (RRC) signaling prior to receiving the PDCCH at the UE.

8. The method of claim 4, further comprising recursively searching the PDCCH search space at a different CCE aggregation level until a validly decoded PDCCH candidate is decoded.

9. The method of claim 3, wherein assigning each CC's DCI into CCEs further comprises:
assigning the CCEs of the CCs with a first transmission mode into a first transmission mode search space with a first transmission mode starting CCE location; and
assigning the CCEs of the CCs with a second transmission mode into a second transmission mode search space with a second transmission mode starting CCE location that differs from the first transmission mode starting CCE location.

10. The method of claim 3, wherein assigning each CC's DCI into CCEs further comprises:
assigning the CCEs of CCs having a same transmission mode as a PDCCH CC into a same search space with a same starting CCE location; and
assigning the CCEs of CCs having a different transmission mode as the PDCCH CC into a plurality of different search spaces corresponding to the different transmission mode CC's transmission mode, wherein the PDCCH CC is the CC transmitting the PDCCH.

11. The method of claim 3, further comprising:
identifying a carrier index (CI) in a DCI format for each of the plurality of CCs associated with the PDCCH at the eNB;
determining a starting CCE location for each assignment in the PDCCH search space based on the CC's CI.

12. The method of claim 11, wherein assigning each CC's DCI into CCEs further comprises:
assigning the CCEs of the CCs with a first transmission mode and a first CI into a first combined transmission mode and CI search space with a first combined transmission mode and CI starting CCE location; and
assigning the CCEs of the CCs with a second transmission mode and a second CI into a second combined transmission mode and CI search space with a second combined transmission mode and CI starting CCE location that differs from the first combined transmission mode and CI starting CCE location, wherein either the first transmission mode differs from the second transmission mode or the first CI differs from the second CI.

13. The method of claim 11, further comprising:
identifying a DCI size of the CC's control information determined by the transmission mode for each of the plurality of CCs associated with the PDCCH at the eNB; and
determining a starting CCE location for each assignment in the PDCCH search space based on the CC's DCI size.

14. The method of claim 13, wherein assigning each CC's DCI into CCEs further comprises:
assigning the CCEs of the CCs with a first transmission mode, a first CI, and a first DCI size into a first combined transmission mode, CI, and DCI size search space with a first combined transmission mode, CI, and DCI size starting CCE location; and
assigning the CCEs of the CCs with a second transmission mode, a second CI, and a second DCI size into a second combined transmission mode, CI, and DCI size search space with a second combined transmission mode, CI, and DCI size starting CCE location that differs from the first combined transmission mode, CI, and DCI size starting CCE location, wherein the first transmission mode differs from the second transmission mode, the first CI differs from the second CI, or the first DCI size differs from the second DCI size.

15. The method of claim 3, further comprising:
identifying a cell radio network temporary identifier (C-RNTI) for each UE associated with the PDCCH at the eNB; and
determining a starting CCE location for each assignment in the PDCCH search space using the C-RNTI.

16. The method of claim 3, further comprising scheduling the PDCCH downlink resource assignments, uplink resource grants, or uplink power control commands for a CC.

17. A computer program product, comprising a non-transitory computer usable medium having a computer readable program code embodied therein, the computer readable program code adapted to be executed to implement a method for allocating a physical downlink control channel (PDCCH) to reduce a number of PDCCH candidates in a search space for carrier aggregation on an evolved NodeB (eNB) comprising:

selecting a control channel element (CCE) aggregation level for a PDCCH allocation for a user equipment (UE);

identifying a transmission mode received via radio resource control (RRC) signalling for each of a plurality of component carriers (CCs) associated with the PDCCH; and assigning each CC's downlink control information (DCI) into CCEs in the PDCCH at a CCE starting location based on each CC's transmission mode and the CCE aggregation level for the UE receiving the CC.

18. A computer program product, comprising a non-transitory computer usable medium having a computer readable program code embodied therein, the computer readable program code adapted to be executed to implement a method for searching a reduced number of physical downlink control channel (PDCCH) candidates in a search space for carrier aggregation on a user equipment (UE) comprising:

searching for a selected component carrier's (CC's) downlink control information (DCI) in a PDCCH search space by identifying a starting control channel element (CCE) location based on the selected CC's transmission mode and a CCE aggregation level for the UE receiving the selected CC;

decoding a validly decoded PDCCH candidate in the PDCCH search space; and obtaining the selected CC's DCI from the validly decoded PDCCH candidate.

\* \* \* \* \*